(No Model.)
A. J. ROBERTSON.
DEVICE FOR CONTROLLING THE AIR ABOUT RUNNING BELTS.
No. 438,644. Patented Oct. 21, 1890.
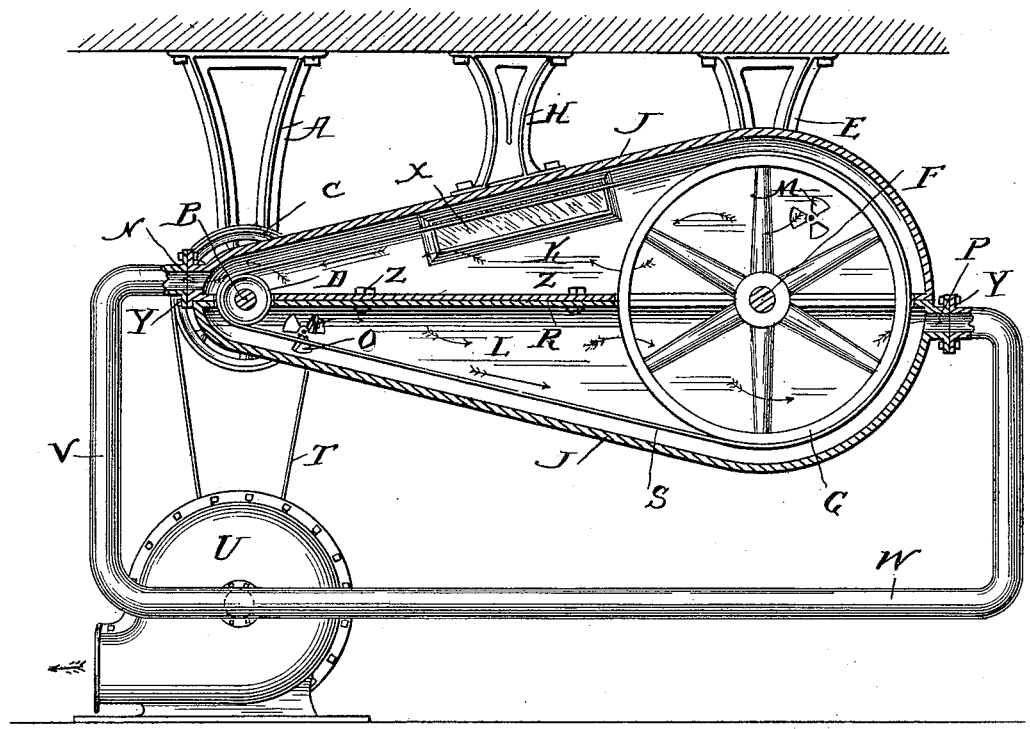

UNITED STATES PATENT OFFICE.

ARCHIBALD J. ROBERTSON, OF CHICAGO, ILLINOIS, ASSIGNOR OF ONE-HALF TO JOHN H. VOGT, OF SAME PLACE.

DEVICE FOR CONTROLLING THE AIR ABOUT RUNNING BELTS.

SPECIFICATION forming part of Letters Patent No. 438,644, dated October 21, 1890.

Application filed January 3, 1890. Serial No. 335,792. (No model.)

*To all whom it may concern:*

Be it known that I, ARCHIBALD J. ROBERTSON, a subject of the Queen of Great Britain, and a resident of Chicago, in the county of Cook and State of Illinois, have invented a certain new and useful Improvement in Devices for Controlling the Air About Running Belts, of which the following is a full, clear, and exact specification.

My invention relates to devices for controlling or exhausting air about the moving portions of belts and running machinery, and has for its object to provide means whereby the air in such cases may be caused to flow in the direction of the moving part, or may be exhausted from about such moving part.

My invention is illustrated in the accompanying drawings, wherein—

A is a hanger, which supports one end of the shaft B, which carries the pulley C and the smaller pulley D.

E is a hanger, which supports one end of the shaft F, which carries the large pulley G.

H is a hanger on which is supported the casing J, though this casing could of course be supported on the shafts B F, or otherwise. This casing is made into two compartments K and L, of substantially equal size, and compartment K is provided with the air-supply damper M and the outlet N, while the compartment L is supplied with the damper O and the outlet P.

R is the diaphragm between the two compartments, and it is of course slotted to permit the rotation of the pulleys D and G, over which travels the belt S.

T is the belt from the pulley C, to drive the fan U, and V is a pipe leading from the outlet N to such fan, and W is a similar pipe leading from the outlet P to the fan.

X is a door in the side of the case. These pipes are secured to the outlets by the bolts Y Y.

The case may be in two parts, bolted together by the bolts Z Z, or otherwise secured together, or it may be a single case with a diaphragm therethrough.

The use and operation of my invention are as follows: The fan U may be driven from any desired source, as, for instance, from the shaft B. The shaft F, in like manner, may be driven from any desired source. Supposing this shaft with its pulley G to be in motion for the purpose of imparting a rapid motion to the shaft B on which the work is to be done, a certain amount of retardation will result from the pressure of the air upon the belt and moving parts or from the friction of the atmosphere upon such belt as it moves. The case J, substantially as shown, being put in place, contains both pulleys and the belt, and if now the parts be set in operation the fan will draw the air from the chamber K in the direction of the motion of the belt, and also from the chamber L in the direction of the motion of the belt. Thus the air with which the belt comes in contact is a current of air moving in the same direction, and, if desired, with the same or greater velocity than the belt. The dampers M and O may be opened to supply air for such current, or if such dampers be closed the case within which the moving parts operate is or may be to a great degree exhausted of air. When this chamber is so exhausted, the working parts are relieved of friction and freed from contact with the contents of the atmosphere if the dampers are closed and otherwise protected. The doors X permit the interior of the apparatus to be examined.

In addition to the utility above suggested of the device herein described, it may be added that there are often reasons why belts should be protected from the atmosphere about them. They may, for example, be used in an exceedingly humid atmosphere or the atmosphere may be of great pressure, in which event the apparatus could be so operated as to prevent the admission of such humid atmosphere in proximity with the belt; or on the other hand, such quantity of atmosphere could be admitted, so as to relieve the belts from the effect of such pressure, and the belt might also be operating in an atmosphere through which heavy currents of air were passing, from the influence of which this device would protect such belts in their often experimental appliances, in which event a belt traveling in vacuum or in a current would be desirable.

Having thus described my invention, what I claim, and desire to secure by Letters Patent, is as follows:

1. The combination of a case with a moving belt therein exteriorly driven, and a fan connected therewith to draw air from or through the case.

2. The combination of a case with a moving belt therein exteriorly driven, and a fan connected therewith to draw air from or through the case and airways within such case, so that the air so drawn moves in the direction of motion of such moving belt.

3. The combination of a two-part case with a belt therein moving partly in each of the two parts, and an air-exhausting fan connected with both of said parts of the case.

4. The combination of a two-part case with a belt therein moving partly in each of the two parts, an air-exhausting fan connected with both of said parts of the case, and dampers in such case located for the admission of air, so that the exhausted air travels in each part in the direction of rotation of the moving portion of the belt therein.

5. The combination of two shafts, two pulleys, one on each shaft, a belt traveling on such pulleys, an inclosing-case, a diaphragm through the same in substantially the same plane as the two shafts, and air-exhausting apparatus to withdraw the air from each part in the direction of motion of the belt therethrough.

ARCHIBALD J. ROBERTSON.

Witnesses:
FRANCIS W. PARKER,
CELESTE P. CHAPMAN.